Feb. 10, 1942.    A. C. LANE ET AL    2,272,749
DYNAMOELECTRIC MACHINE
Filed Sept. 30, 1940    3 Sheets-Sheet 1

Inventors:
Arthur C. Lane,
Bernard Adkins,
by Harry E. Dunham
Their Attorney.

Feb. 10, 1942.  A. C. LANE ET AL  2,272,749
DYNAMOELECTRIC MACHINE
Filed Sept. 30, 1940   3 Sheets-Sheet 3

Inventors:
Arthur C. Lane,
Bernard Adkins,
by Harry E. Dunham
Their Attorney.

Patented Feb. 10, 1942

2,272,749

UNITED STATES PATENT OFFICE 2,272,749

DYNAMOELECTRIC MACHINE

Arthur C. Lane and Bernard Adkins, Rugby, England, assignors to General Electric Company, a corporation of New York Application September 30, 1940, Serial No. 359,120
In Great Britain May 22, 1939

8 Claims. (Cl. 171—228)

This invention relates to dynamoelectric machines and more particularly to alternating current commutator machines. In such machines the output per pole is limited by the voltage induced between adjacent segments. It is known to use the duplex type of winding in which two winding circuits are used, of which one is connected to alternate commutator segments, while the other is connected to the remaining segments. In this way the voltage between adjacent segments is one half of the voltage induced in one turn. In order to maintain the voltage of any segment intermediate between those of the segments next on either side, an equipotential connector has hitherto been connected between the segment and the opposite end of the coil connected to the other two segments, such connector being outside the magnetic circuit of the windings, as described in United States Patent No. 1,832,703, November 17, 1931 to Hull.

It is also known to reduce the segment voltage of a commutator winding by shortening the pitch of the coils to any value less than 100% pitch.

According to the present invention, a duplex winding of the type described is used in conjunction with a short-pitch winding wound in the same slots and connected to the same commutator segments in parallel with the duplex winding. A single turn of one section of the duplex winding is connected to segments two apart, across which are connected two turns of the short-pitch winding, each turn being of one third full pitch. The mid point of the two turns of the short-pitch winding, that is, the end of the first turn and the beginning of the second turn, which is thus at the commutator end of the windings is connected to the intermediate segment and thus to the other section of the duplex winding. The short pitch winding thus maintains the intermediate segment at the correct potential and the equipotential connector described in Patent 1,832,703 may be omitted.

The omission of such equipotential connectors may be advantageous in many ways, since they are expensive and difficult of winding and they lead in many cases to shaft currents which can only be obviated by the insulation of bearings, etc.

Figure 1:
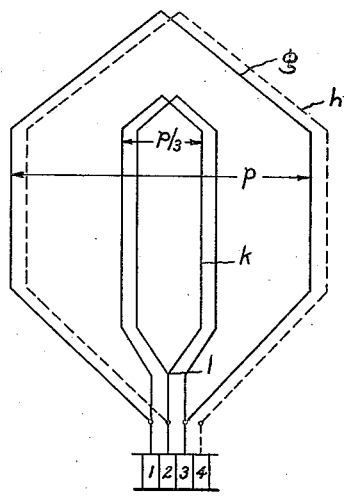
Figure 2:
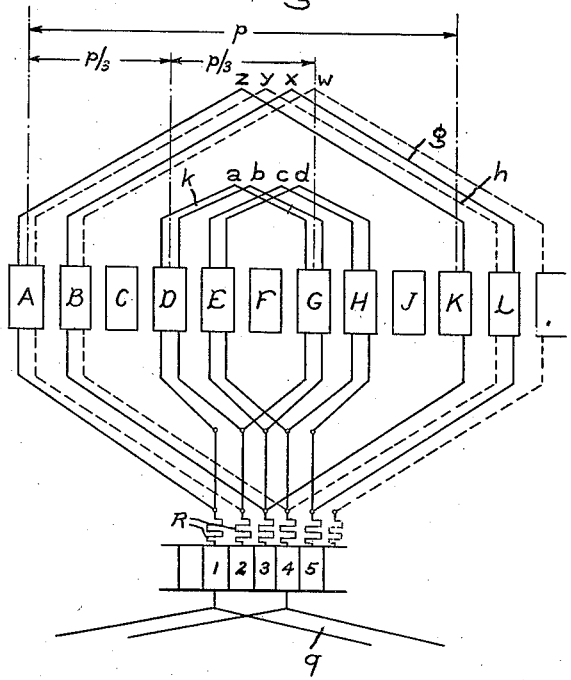
Figure 6:
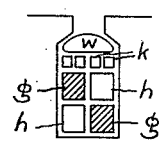
Figure 7:
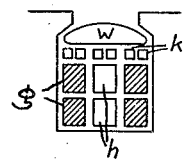
Figure 8:
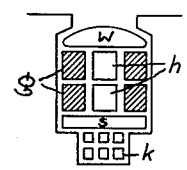
Figure 9:
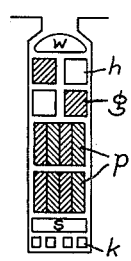
Figure 3:
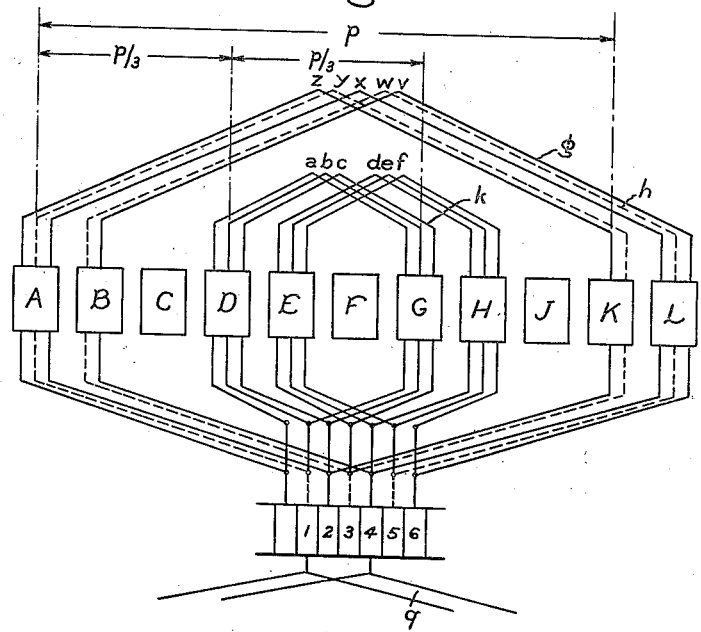
Figure 4:
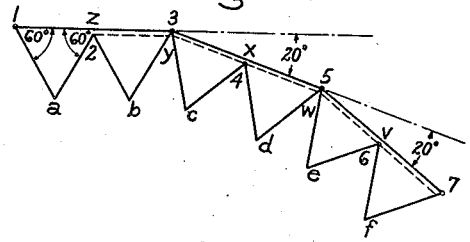
Figure 5:
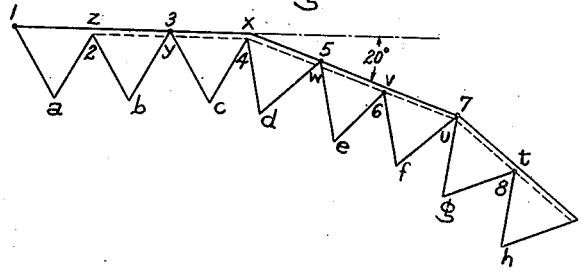
Figure 10:
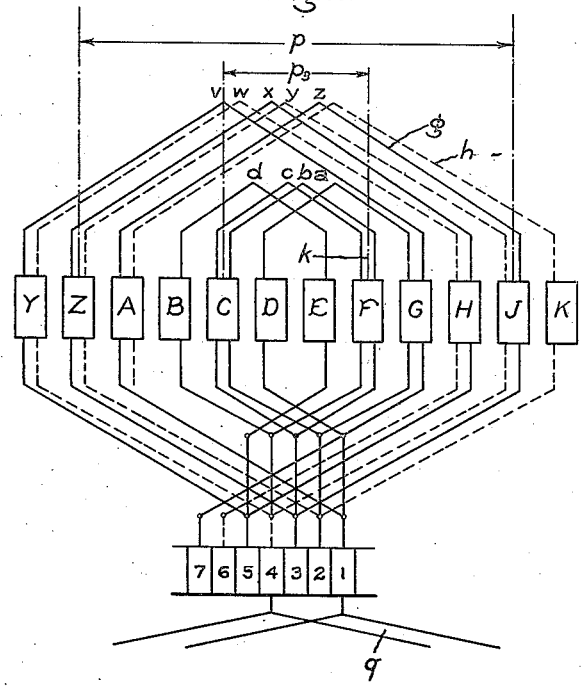
Figure 11:
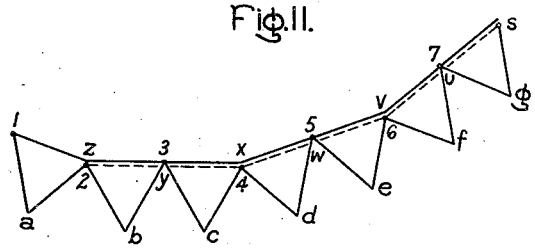

Referring to the drawings accompanying the specification which serve to illustrate this invention, Fig. 1 represents the general arrangement of the two windings, Figs. 2 and 3 show preferred embodiments of the invention for two typical cases, the windings being shown in development, Fig. 2 representing a case with two commutator segments per slot and Fig. 3 representing a case with three commutator segments per slot, both having forward progression of winding, Figs. 4 and 5 show the voltage vectors for the arrangements shown in Figs. 2 and 3 respectively; Figs. 6 and 7 show the disposition of the conductors of the two windings in a slot, corresponding to the arrangement shown in Figs. 2 and 3 respectively; and Fig. 8 an alternative disposition of the conductors in the slot corresponding to the arrangement shown in Fig. 3. Fig. 9 shows one method of application of the invention to the Schrage type motor. Figs. 10 and 11 show how the invention is best embodied when the winding progression of the armature is backward, Fig. 10 being the development of a winding with two commutator segments per slot and Fig. 11 the voltage vector diagram corresponding thereto.

Referring to Fig. 1, $g$ and $h$ represent the two sections of the duplex winding of full pitch, and $k$ represents the short pitch winding of one third of full pitch. Coil $g$ is connected across commutator segments $l$ and $3$ while coil $h$ is similarly connected across segments $2$ and $4$. Two turns of coil $k$ are also connected across segments $l$ and $3$ while the mid-point of the turns of coil $k$, that is, the point $l$, is connected to segment $2$ and thus to one end of coil $h$.

A more detailed description of the execution of our invention is seen by reference to Figs. 2, 3 and 10 where A, B, C, etc. represent the slots; $l$, $2$, $3$, etc. represent the commutator segments; $g$ and $h$ the duplex winding; $k$ the short pitch winding; $a$, $b$, $c$, etc. the back-ends of the short-pitch winding and $z$, $y$, $x$, etc. the back-ends of the duplex winding. Conductors $q$ represent the usual commutator equalizing winding. For example, the pole pitch $p$ is chosen as nine slot pitches so that 100% pitch is represented by the span A to K. In Fig. 2 we have shown that all coils $k$ have a pitch of 33⅓%, while any coil of the short-pitch winding joining any pair of adjacent commutator segments is symmetrically placed in relation to the two half coils of the duplex winding joined to the same commutator segments. In Figs. 4, 5 and 11 the voltage vectors of the duplex and short-pitch winding are represented in relative magnitude and in direction by lines lettered and numbered in exact correspondence to the letters and numbers of Figs. 2, 3 and 10 respectively. For example, the line $l$—$a$ in Fig. 4 represents the direction and magnitude of the voltage in the conductor joining segment $l$ with the evolute $a$ at the back of the short-pitch winding in Fig. 2.

It can be seen by reference to Figs. 4, 5 and 11 that such arrangement of windings gives rise to no out-of-balance voltages due to the fundamental flux that can cause circulating currents to flow between the windings. This arrangement is only possible if the following conditions are fulfilled:

(1) The number of slots per pole divided by three shall be integral, in order that the short-pitch winding may have a winding pitch of 33⅓%.

(2) Where winding progression is forward, one coil per slot of the duplex winding shall have a winding pitch equal to 100% plus one slot pitch, and the remaining number of coils per slot of the duplex winding shall have 100% pitch.

(3) Where the winding progression is backward, one coil per slot of the duplex winding shall have a winding pitch equal to 100% minus one slot pitch, and the remaining number of coils per slot of the duplex winding shall have 100% pitch.

(4) Each coil-side of the short-pitch winding shall be one third of a pole pitch distant from the coil-side of the duplex winding connected to the same commutator bar. In such an arrangement the short pitch winding produces the same commutator voltage as the duplex winding sections with which it is connected in parallel and maintains a uniform potential gradient between consecutive commutator segments.

As regards the disposition of the two windings in the slots, the short-pitch winding may occupy the upper portion of the slot near the air-gap and immediately beneath the wedge W, as shown in Figs. 6 and 7. Or it may be placed at the bottom of the slot beneath the duplex winding g, h, as shown in Fig. 8. It may further be separated from the duplex winding by a separator S of magnetic or non-magnetic material. The duplex and short-pitch windings may either or both be wound in a single or double layer manner, and Figs. 6, 7 and 8 are to be regarded as typical only of many methods of disposing the conductors in the slots. As a further instance, a Schrage type motor rotor according to our invention may have the duplex commutator winding at the top of the slot, the main primary slip-ring winding P beneath it and the short-pitch commutator winding beneath the primary winding and separated from it by material S if desired, as shown in Fig. 9.

Since there are no circulating currents flowing between the duplex and short-pitch windings caused by unbalanced voltages due to the fundamental flux, the two windings may be made to share the load current in any desired ratio and both are effective in this respect. The use of the combined windings therefore maintains a high effectiveness of current-carrying capacity. It is useful in many instances to make the short-pitch winding of relatively high resistance compared with the duplex winding by the use of high resistance material or small section or both, and even in such a case it still shares in the carrying of the load current although it may be used in addition to improve the nature of the commutation.

A further extension of the invention consists in the addition of resistance connectors between the combined duplex and short-pitch windings and the commutator in similar manner to the use of such resistance connectors with simplex windings. For example, the resistance connectors may be interposed between the combined windings and the commutator at the commutator end of the windings and external to the core as at R in Fig. 2.

What we claim as new and desire to secure by Letters Patent of the United States, is:

1. An alternating current dynamo-electric commutator machine having a duplex winding and a short pitch winding wound in the same slots and connected to the same commutator segments, a single turn of one section of the duplex winding being connected to segments two apart, across which segments are connected two turns of the short pitch winding of which each turn is one third of full pitch and the mid point of the two turns is connected to the intermediate commutator segment and thus to the other section of the duplex winding, whereby to give substantially equal voltages across corresponding commutator segments.

2. An alternating current dynamo-electric commutator machine having a duplex winding and a short pitch winding wound in the same slots and connected to the same commutator segments, a single turn of the duplex winding being connected to segments two apart, across which segments are connected two turns of the short pitch winding, the mid point of the two turns being connected to the intermediate commutator segments, the duplex windings being of full pitch and each coil-side of the short pitch winding being one third of a pole pitch from the coil side of the duplex winding connected to the same commutator segment.

3. An alternating current dynamo-electric machine armature winding in accordance with claim 1, in which the short pitch winding is of relatively high resistance.

4. An alternating current dynamo-electric machine armature winding in accordance with claim 1, having resistance connectors interposed between the commutator and the combined duplex and short-pitched windings.

5. An alternating current commutator motor rotor member comprising a slotted magnetic core, a duplex full-pitch commutator winding in the top of the slots, a short-pitch commutator winding in the bottoms of the slots and a primary slip ring winding between the commutated windings in the same slots, a single turn of one section of the duplex winding being connected to commutator segments two apart, across which segments are connected two turns of the short-pitch winding of which each turn is one-third of full pitch and the mid point of the two turns is connected to the intermediate commutator segment and thus to the other section of the duplex winding.

6. An alternating current commutator motor rotor having a duplex full-pitch winding, one section being connected to alternate commutator segments and the other section being connected to the remaining segments, another winding having coils with a greater number of turns and a shorter pitch than the coils of the duplex winding connected to all of the commutator segments, said shorter pitch winding producing the same commutator voltage as the duplex winding sections with which it is connected in parallel and maintaining a uniform potential gradient between consecutive commutator segments.

7. An alternating current dynamo-electric machine armature winding in accordance with claim 2 in which the short pitch is of relatively high resistance.

8. An alternating current dynamo-electric machine armature winding in accordance with claim 2 having resistance connectors interposed between the commutator and the combined duplex and short pitch winding.

ARTHUR C. LANE.
BERNARD ADKINS.